United States Patent
Kim (10) Patent No.: US 9,621,774 B2
(45) Date of Patent: Apr. 11, 2017

(54) CAMERA MODULE

(71) Applicant: LG INNOTEK CO., LTD., Seoul (KR)

(72) Inventor: Hack Ho Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 18 days.

(21) Appl. No.: 14/771,731

(22) PCT Filed: Mar. 25, 2014

(86) PCT No.: PCT/KR2014/002503
§ 371 (c)(1),
(2) Date: Aug. 31, 2015

(87) PCT Pub. No.: WO2014/157917
PCT Pub. Date: Oct. 2, 2014

(65) Prior Publication Data
US 2016/0028930 A1    Jan. 28, 2016

(30) Foreign Application Priority Data

Mar. 25, 2013  (KR) .................. 10-2013-0031690
Mar. 26, 2013  (KR) .................. 10-2013-0031816

(51) Int. Cl.
*H04N 5/225* (2006.01)
*G03B 3/10* (2006.01)
(Continued)

(52) U.S. Cl.
CPC ............ *H04N 5/2254* (2013.01); *G03B 3/10* (2013.01); *G03B 5/00* (2013.01); *H04N 5/2253* (2013.01);
(Continued)

(58) Field of Classification Search
CPC ................................................ H01L 27/14625
See application file for complete search history.

(56) References Cited

U.S. PATENT DOCUMENTS

2009/0051774 A1   2/2009   Shiraishi
2009/0103194 A1   4/2009   Chen
(Continued)

FOREIGN PATENT DOCUMENTS

| JP | 2011-099885 A | 5/2011 |
| KR | 10-2011-0071550 A | 6/2011 |
| KR | 10-2012-0067104 A | 6/2012 |

OTHER PUBLICATIONS

International Search Report in International Application No. PCT/KR2014/002503 filed Mar. 25, 2014.

*Primary Examiner* — Jason Flohre
*Assistant Examiner* — Dwight C Tejano
(74) *Attorney, Agent, or Firm* — Saliwanchik, Lloyd & Eisenschenk (57) ABSTRACT

A camera module, according to an embodiment of the present invention, comprises: a printed circuit board, on which an image sensor is mounted; a lens barrel installed on the printed circuit board and having at least one lens installed therein; an actuator module which is assembled in the lens barrel and includes first and second actuators having first and second moving lenses, respectively, installed therein, wherein the first and second moving lenses respectively perform and auto focusing function on an image formed at the image sensor and an image stabilization function; and a connector which is formed in the lens barrel and connected to the actuator module such that electricity can flow therebetween.

17 Claims, 9 Drawing Sheets (51) Int. Cl.
*G03B 5/00* (2006.01)
*H04N 5/232* (2006.01)
(52) U.S. Cl.
CPC ....... *H04N 5/2257* (2013.01); *H04N 5/23264* (2013.01); *H04N 5/23287* (2013.01); *H04N 5/23212* (2013.01)

(56) References Cited

U.S. PATENT DOCUMENTS

| | | | | |
|---|---|---|---|---|
| 2011/0159919 | A1* | 6/2011 | Kim | G02B 7/08 455/556.1 |
| 2013/0182136 | A1* | 7/2013 | Ishizue | G02B 13/0035 348/208.11 |
| 2013/0287383 | A1* | 10/2013 | Haruguchi | G03B 3/10 396/133 |
| 2014/0055630 | A1* | 2/2014 | Gregory | G03B 3/02 348/208.2 |
| 2014/0333784 | A1* | 11/2014 | Hu | G02B 27/646 348/208.2 |
| 2015/0116514 | A1* | 4/2015 | Kim | G02B 27/646 348/208.4 |

* cited by examiner

CAMERA MODULE

CROSS-REFERENCE TO RELATED APPLICATIONS

This application is the U.S. national stage application of International Patent Application No. PCT/KR2014/002503, filed in Mar. 25, 2014, which claims priority to Korean Application Nos. 10-2013-0031690, filed Mar. 25, 2013, and 10-2013-0031816, filed Mar. 26, 2013, the disclosures of which are incorporated herein by reference in their entirety.

BACKGROUND

Field of the Disclosure

The present disclosure relates to a camera module.

Discussion of the Related Art

Conventional technology such as VCM (Voice Coil Motor) used in general camera modules is difficult to be applied to subminiature and low power consuming camera modules. Thus, relating researches have been actively conducted.

For the case of camera modules installed in small electronic products such as smart phones, the camera module may frequently be impacted during being used. In addition, the camera module may be minutely trembled according to the user's handshaking during taking a picture.

In view of such points as discussed above, a camera module additionally having a means to prevent handshaking installed therein is required to be developed.

In general, an OIS (Optical Image Stabilization) module is categorized, according to an object to move in x, y-coordinates, by a lens shift configured to move the lens in horizontal directions, a sensor shift configured to move the image sensor in horizontal directions, and a module tile configured to move the AF (Auto Focus) module in horizontal directions.

However, in the case when both the AF module and the OIS module are installed in the camera module, there is an inconvenience of providing separate actuators for implementing each of these functions.

SUMMARY OF THE DISCLOSURE

One of purposes of the present disclosure is to provide a camera module having an enhanced structure so as to reduce assembly faults, by ameliorating the assembly process of the auto-focusing unit and the handshake compensation device.

In a general aspect of the present disclosure, there is provided a camera module, the camera module comprising: a printed circuit board having an image sensor mounted thereon; a lens barrel mounted on the printed circuit board and having at least one lens installed therein; an actuator module assembled with the lens barrel and including first and second actuators, the first and the second actuators having first and second moving lenses respectively installed in the first and the second actuators, the first and the second moving lenses configured to respectively perform an auto focusing function and a handshake compensation function for an image formed on the image sensor; and a connection portion formed on the lens barrel and conductibly connected with the actuator module.

In some exemplary embodiments of the present disclosure, the first and the second moving lenses may be assembled after an assembly process of the first and the second actuators.

In some exemplary embodiments of the present disclosure, the actuator module may include: a first printed circuit board being packaged with a first support portion and having the first actuator mounted thereon; and a second printed circuit board being packaged with a second support portion and having the second actuator mounted thereon, wherein one side end portion of each of the first and the second printed circuit boards may be conductibly connected to the connection portion.

In some exemplary embodiments of the present disclosure, the first and the second moving lenses may be assembled with the first and the second actuators before an assembly process of the first and the second support portions.

In some exemplary embodiments of the present disclosure, the first and the second moving lenses may be assembled with the first and the second actuators after an assembly process of the first and the second support portions.

In some exemplary embodiments of the present disclosure, a third support portion corresponding to the first support portion may be provided on an upper side surface of the first printed circuit board to support the first actuator along with the first support portion.

In some exemplary embodiments of the present disclosure, a third support portion corresponding to the first support portion is provided on an upper side surface of the first printed circuit board to support the first actuator, and the first to the third support portions, each size corresponding to the other, may be coupled all at once.

In some exemplary embodiments of the present disclosure, the first and the second printed circuit boards may be formed of F-PCB.

In some exemplary embodiments of the present disclosure, the camera module of claim may further comprise: a plurality of first beads and second beads interposed on a connection portion between the first and the second printed circuit boards and the first and the second actuators, wherein each of the first and the second beads may be arranged at a positions not interfering with each other.

In some exemplary embodiments of the present disclosure, one end of the connection portion may be conductibly connected to the actuator module and another end of the connection portion may be conductibly connected to the printed circuit board.

In another general aspect of the present disclosure, there is provided a camera module, the camera module comprising: a printed circuit board having an image sensor mounted thereon; a lens barrel mounted on the printed circuit board and having at least one lens installed therein; an actuator module assembled with the lens barrel and including a module actuator, the module actuator having first and second moving lenses installed in the module actuator, the first and the second moving lenses configured to respectively perform an auto focusing function and a handshake compensation function for an image formed on the image sensor; and a connection portion formed on the lens barrel and conductibly connected with the actuator module.

In some exemplary embodiments of the present disclosure, the first and the second moving lenses may be assembled after an assembly process of the module actuator.

In some exemplary embodiments of the present disclosure, the actuator module may include a housing member supporting both ends of the module actuator, and one side end portion of the module printed circuit board may be conductibly connected to the connection portion.

In some exemplary embodiments of the present disclosure, the first and the second moving lenses are assembled with the actuator module after an assembly process of the housing member.

In some exemplary embodiments of the present disclosure, the module printed circuit board may be formed of F-PCB.

In some exemplary embodiments of the present disclosure, the camera module may further comprising: a plurality of first beads and second beads interposed on a connection portion between the module printed circuit board and first and second actuators, wherein each of the first and the second beads may be arranged at a position not interfering with each other.

In some exemplary embodiments of the present disclosure, one end of the connection portion may be conductibly connected to the actuator module and another end of the connection portion may be conductibly connected to the printed circuit board.

Advantageous Effects

According to an exemplary embodiment of the present disclosure, assemblability may be enhanced when implementing the auto focusing function and handshake compensation function suing the actuator.

In addition, according to an exemplary embodiment of the present disclosure, impact and load delivered to the actuator occurring during an assembly process of the lens may be minimized.

In addition, according to an exemplary embodiment of the present disclosure, the auto focusing module and the handshake compensation module are forming one single actuator module, and thereby the assembly process of the camera module may be simplicated.

DETAILED DESCRIPTION

Hereinafter, an exemplary embodiment of the present disclosure will be described with reference to enclosed drawings.

Figure 1:
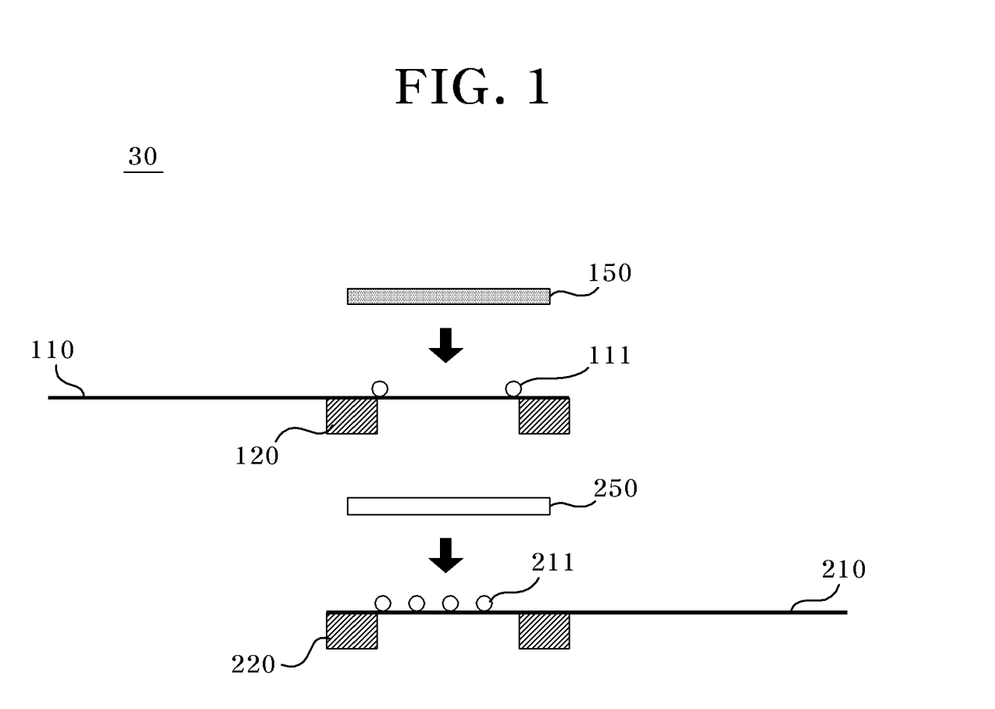
FIGS. 1 to 3 are schematic views illustrating an assembly process of an actuator module of the camera module according to a first exemplary embodiment of the present disclosure.
Figure 2:
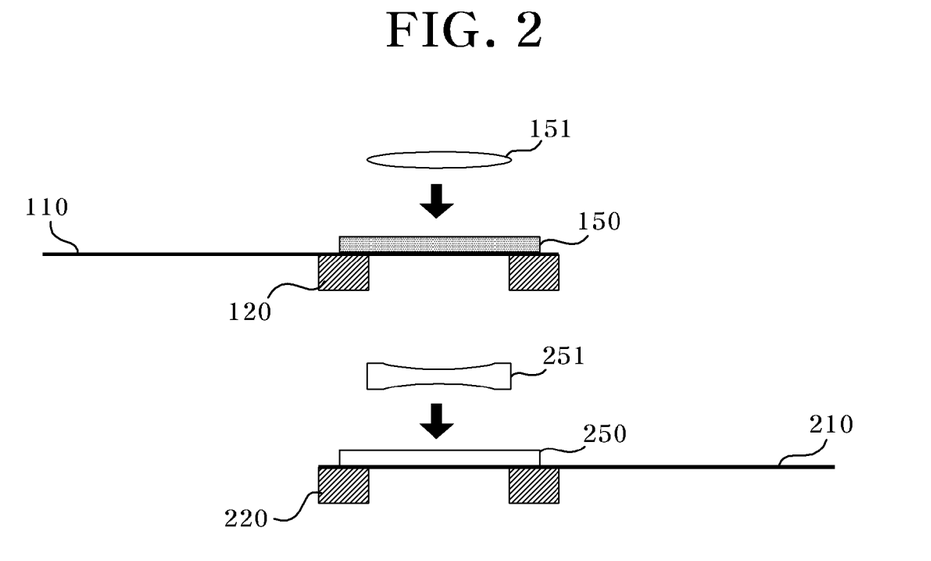
Figure 3:
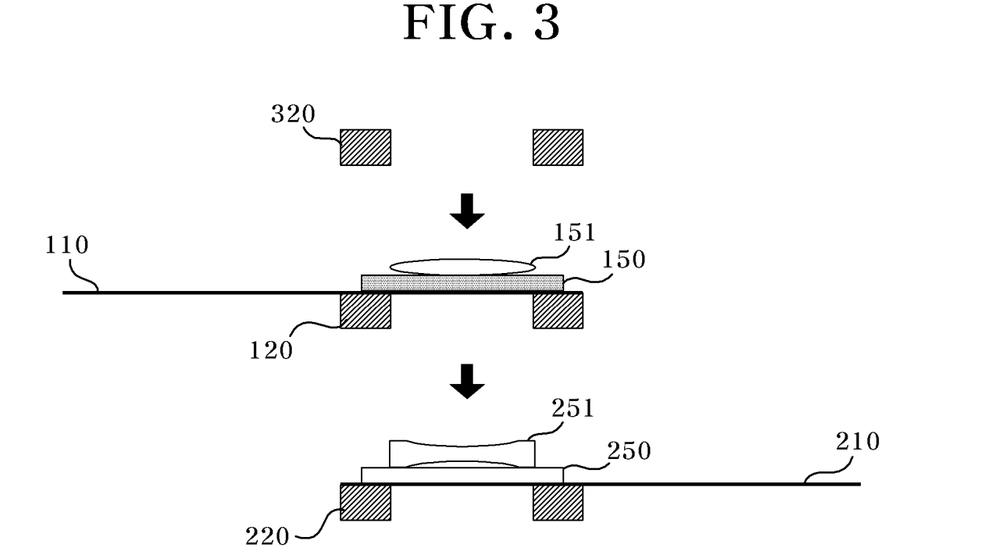
Figure 4:
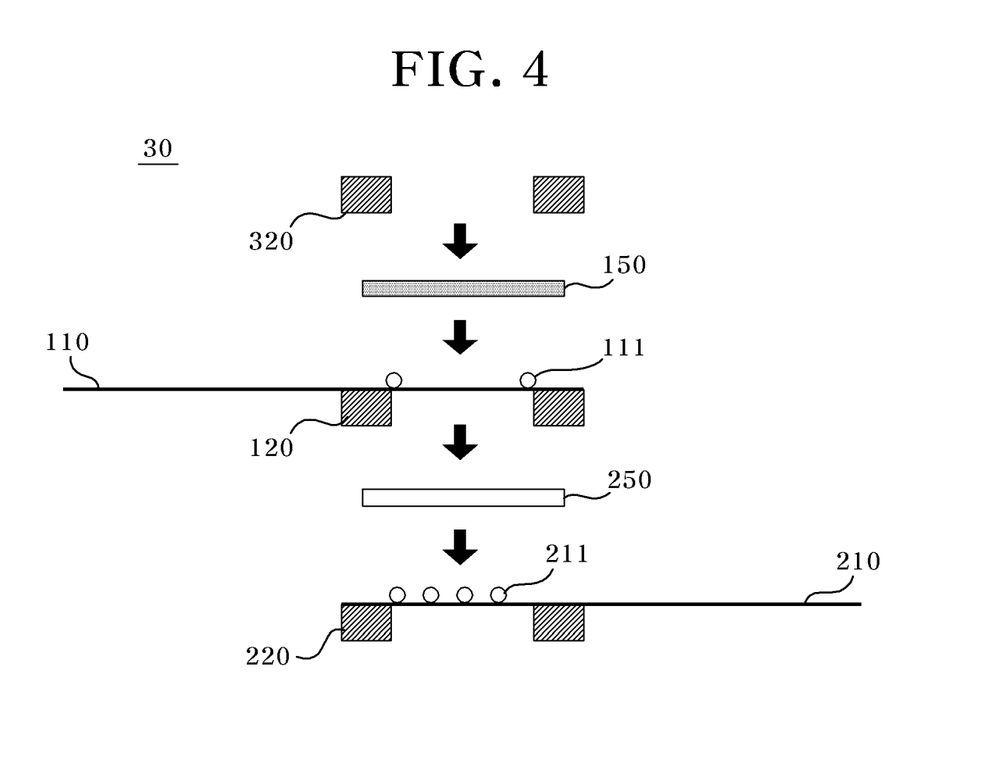
FIGS. 4 to 6 are schematic views illustrating an assembly process of an actuator module of the camera module according to a second exemplary embodiment of the present disclosure.
Figure 5:
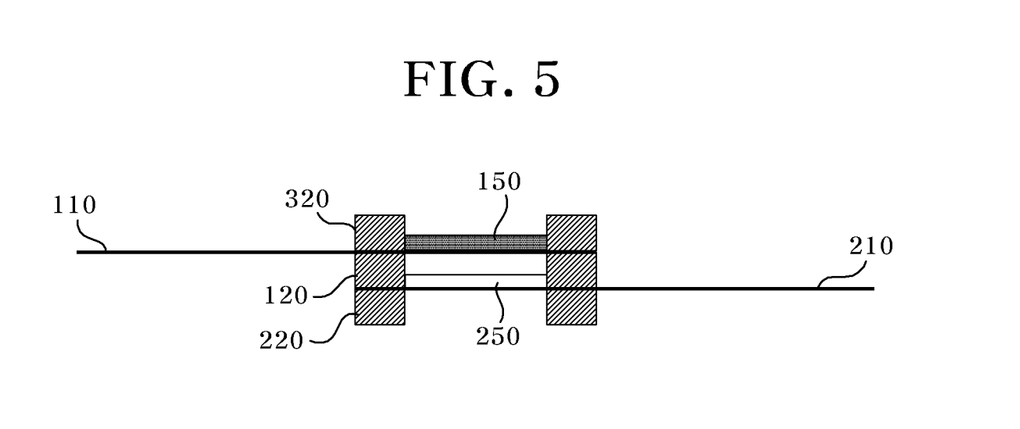
Figure 6:
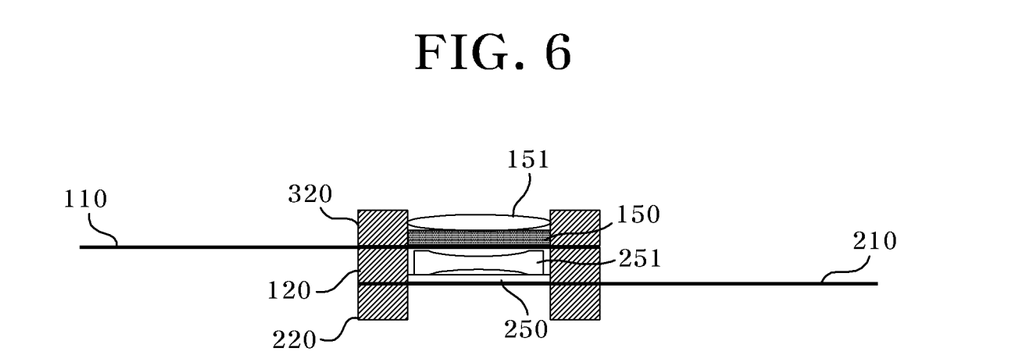
Figure 7:
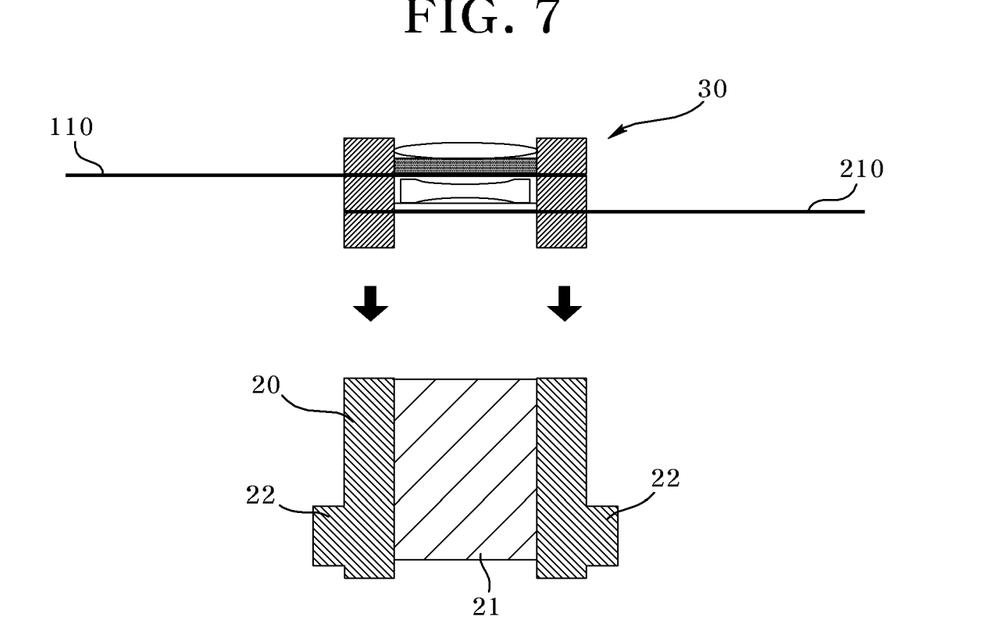
FIG. 7 is a schematic view illustrating a process to assemble an actuator module according to first and second exemplary embodiments of the present disclosure with a lens barrel.
Figure 8:
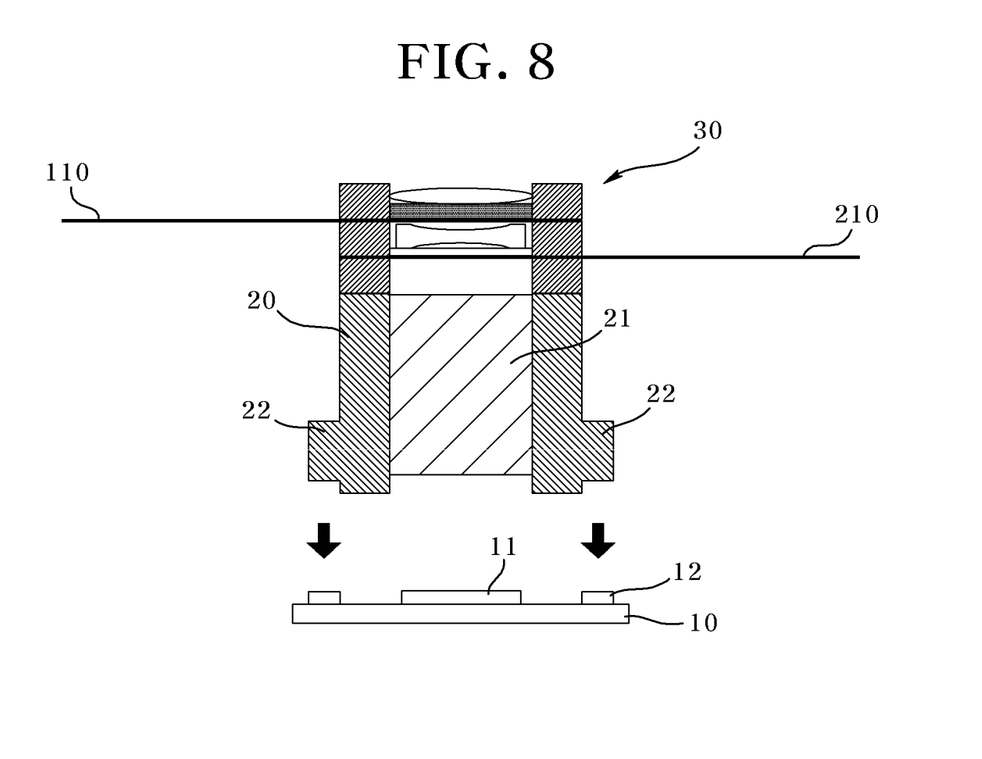
FIG. 8 is a schematic view illustrating a process to assemble a lens barrel having an actuator module coupled thereto with a printed circuit board having an image sensor mounted thereon.
Figure 9:
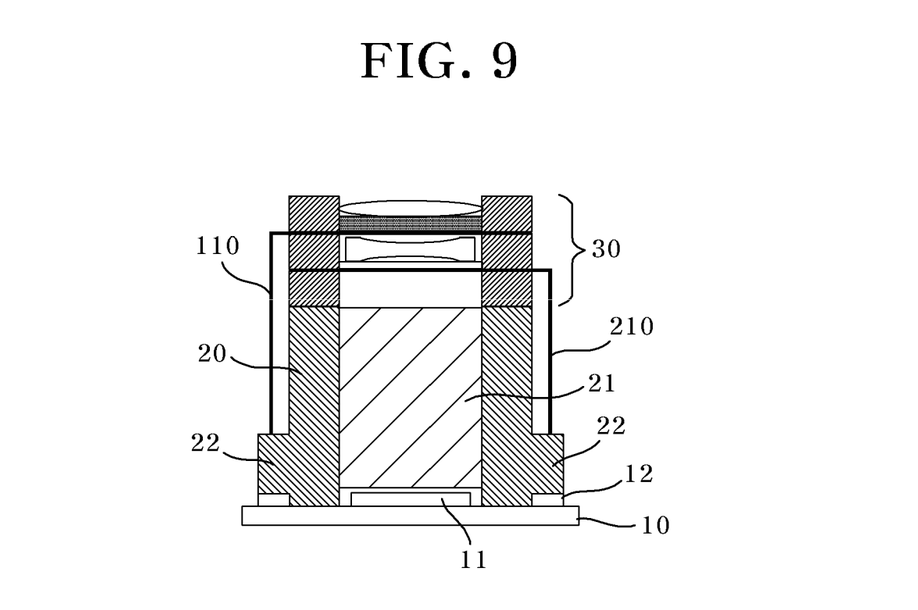
FIG. 9 is a schematic view illustrating a process to electrically connect an actuator module to a printed circuit board.

FIGS. 1 to 3 are schematic views illustrating an assembly process of an actuator module of the camera module according to a first exemplary embodiment of the present disclosure; FIGS. 4 to 6 are schematic views illustrating an assembly process of an actuator module of the camera module according to a second exemplary embodiment of the present disclosure; FIG. 7 is a schematic view illustrating a process to assemble an actuator module according to first and second exemplary embodiments of the present disclosure with a lens barrel; FIG. 8 is a schematic view illustrating a process to assemble a lens barrel having an actuator module coupled thereto with a printed circuit board having an image sensor mounted thereon; and FIG. 9 is a schematic view illustrating a process to electrically connect an actuator module to a printed circuit board.

As illustrated in FIGS. 1 to 6, the camera module according to an exemplary embodiment of the present disclosure may include an actuator module (30) where an auto focusing module and a handshake compensation module are integratedly formed or formed as a single package.

As illustrated in FIGS. 1 to 3, the actuator module (30) according to a first exemplary embodiment of the present disclosure may include a first printed circuit board (110), a second printed circuit board (210), a first actuator (150), a second actuator (250), a first moving lens (151) and a second moving lens (251).

The first printed circuit board (110) may be formed of F-PCB or may be provided as another type of printed circuit board for circuit connection, and as illustrated in the figures, may include, on a surface thereof, a first bead (111) to connect a plurality of terminals. A first support portion (120) may be provided on a lower surface of the first printed circuit board (110).

The second printed circuit board (210) may be formed of F-PCB or may be provided as another type of printed circuit board for circuit connection, and as illustrated in the figures, may include, on a surface thereof, a second bead (211) to connect a plurality of terminals. A second support portion (220) may be provided on a lower surface of the second printed circuit board (210).

Meanwhile, as illustrated in the figures, each of the first and the second printed circuit boards (110) (210) may be extended to the direction opposite to each other, but not limited hereto. In addition, each of the first and the second beads (111) (211) may be arranged at a positions not interfering with each other, but not limited hereto.

The first and the second beads (111) (211) may be connected to terminal portions (not illustrated), and through such terminal portions, may deliver electric power and/or control signals supplied from the first and the second printed circuit boards (110) (210). As an example, the first and the second printed circuit boards (110) (210) may apply electric power supply of positive (+) and negative (−) electrodes, and may control the first and the second actuator (150) (250) using control elements mounted on the first and the second printed circuit boards (110) (210).

Meanwhile, as illustrated in FIG. 1, the actuator module (30) according to a first exemplary embodiment of the present disclosure may separately perform a process to package the first actuator (150) with the first printed circuit board (110) and a process to package the second actuator (250) with the second printed circuit board (210). Here, each of the packaging processes may be performed at the same time.

In addition, as illustrated in FIG. 2, the first and the second moving lenses may be mounted on the packaged first and second printed circuit boards (110) (210). Afterwards, the actuator module (30) may be formed by coupling the first and the second support portions (120) (220) with a third support portion (320) supporting an upper portion of the first actuator (150).

As illustrated in FIGS. 4 to 6, the actuator module (30) according to a second exemplary embodiment of the present disclosure has the same basic structure as that of the actuator module (30) according to the first exemplary embodiment of the present disclosure. However, the assembly process thereof is different.

That is, as illustrated in FIGS. 4 and 5, coupling and packaging processes of the first and the second printed circuit boards (110) (210), the first and the second actuators (150) (250) and the first to the third support portions (120) (220) (320) may be performed all at once. In addition, as illustrated in FIG. 6, the first and the second moving lenses (151) (251) may be mounted for the last on the first and the second printed circuit board (of which packaging and assembly have been completed) and the first and the second actuator (150) (250).

Meanwhile, the first and the second actuators (150) (250) are modules that may respectively move each of the first and the second moving lenses (151) (251). Modules such as micro actuators, silicon actuators, disk-typed actuators, VCM (Voice Coil Motor), Piezo/Polymer lenses, optical diagrams, or liquid crystal micro lenses may be used as the first and the second actuators (150) (250).

However, the structure of the first and the second actuators (150) (250) is not limited hereto. Various structures may be used according to the design of the camera module. For example, the first and the second moving lenses (151) (251) may adjust refractive index of the light passing therethrough to perform the auto focusing and/or the handshake compensation functions.

As an example, the first and the second moving lenses (151) (251) may be formed of any one of variable lenses such as LC (Liquid Crystal) lens, liquid lens, Piezo/Polymer lens. Otherwise, the first and the second moving lenses (151) (251) may be formed as a MEMS (Micro Electro-Mechanical System) actuator configured to perform auto focusing function by physically moving a single lens to adjust focal distance.

In addition, the first and the second moving lenses (151) (251) may be coated with infrared cut off material on a surface thereof, and therefore may not require any separate infrared cut off material to be installed on the optical path.

According to an exemplary embodiment of the present disclosure, the first actuator (150) may be configured to perform auto focusing function, and the second actuator (250) may be configured to perform handshake compensation function, but not limited hereto. The functions of the first and the second actuator (150) (250) may be configured in reverse.

Once the actuator module (30) is formed according to the foregoing first and second exemplary embodiments of the present disclosure, the actuator module (30) may be coupled to a lens barrel (20) having at least one lens (21) installed therein, as illustrated in FIG. 7. The actuator module (30) may be arranged in various positions. According to an exemplary embodiment of the present disclosure, the actuator module (30) may be installed at an upper portion of the lens barrel, as illustrated in FIG. 7. This is because the widest operation range, where the first and the second moving lenses (151) (251) installed in the actuator module (30) are operable, may be provided.

The actuator module (30) and the lens barrel (20) may be coupled using adhesive member such as glue, epoxy, double-sided adhesive tape, etc. Otherwise, they may be coupled by a process such as heat welding or ultrasonic welding where the body components are connected to each other, or although it is not illustrated in the drawings, they may be physically coupled by forming complementary combinational structures.

After such coupling of the actuator module (30) and the lens barrel (20), as illustrated in FIG. 8, a printed circuit board (10) having an image sensor (11) mounted thereon may be coupled to a lower portion of the lens barrel (20). Here, at least one pair of terminal portions (12) may be formed on the printed circuit board (10), and the terminal portions (12) may be connected to a connection portion (22) to deliver electrical power and control signals to the lens barrel (20) and the actuator module (30). Here, the terminal portion (12) may be formed by being protruded on a surface of the printed circuit board (10), otherwise, by being intruded so as not to be protruded to outside, or may be formed flat thereon.

That is, as illustrated in FIG. 9, the first and the second printed circuit boards (110) (210) may be coupled to the connection portion (22) of the lens barrel (20) connected to the printed circuit board (10). As illustrated in FIG. 9, one end of the connection portion (22) may be conductibly connected to the first and the second printed circuit boards (110) (210), and another end of the connection portion is conductibly connected to the printed circuit board (10), so as to conductibly connect the first and the second printed circuit boards (110)(210) and the printed circuit board (10). The structure of the connection portion (22) may be formed in various ways. For example, a terminal member of metallic material may be formed on the lens holder (20), or an electronic circuit pattern layer for electrical wiring may be formed using a known surface electrode formation technology. Otherwise, the wiring may be formed using a separate wiring member.

In addition, although it is not illustrated in the figures, instead of the first and the second printed circuit boards (110) (210), an electronic pattern layer using a known surface electrode formation technology may be formed, or the first and the second actuators (150) (250) and the printed circuit board (10) may be conductibly connected using a separate wiring member.

On this wise, an actuator module (30) to perform a plurality of functions may be formed, and the first and the second moving lenses (151) (251) may be assembled after the assembly process of the first and the second actuators (150) (250), when assembling the camera module. Thereby, the assembly faults occurrable during assembly process of the first and the second moving lenses (151) (251), and assemblability of the camera module may be enhanced.

In particular, the force generated during the lens assembly process may not be directly delivered to the first and the second actuators (150) (250) so as to minimize the assembly faults occurrable during assembly process, because the first and the second moving lenses (151) (251) are respectively assembled with the first and the second actuators (150) (250)

after the first and the second actuators (150) (250) are supported by the first and the second support portions (120) (220).

The camera module according to another exemplary embodiment of the present disclosure is illustrated in FIGS. 10 to 15.

Figure 10:
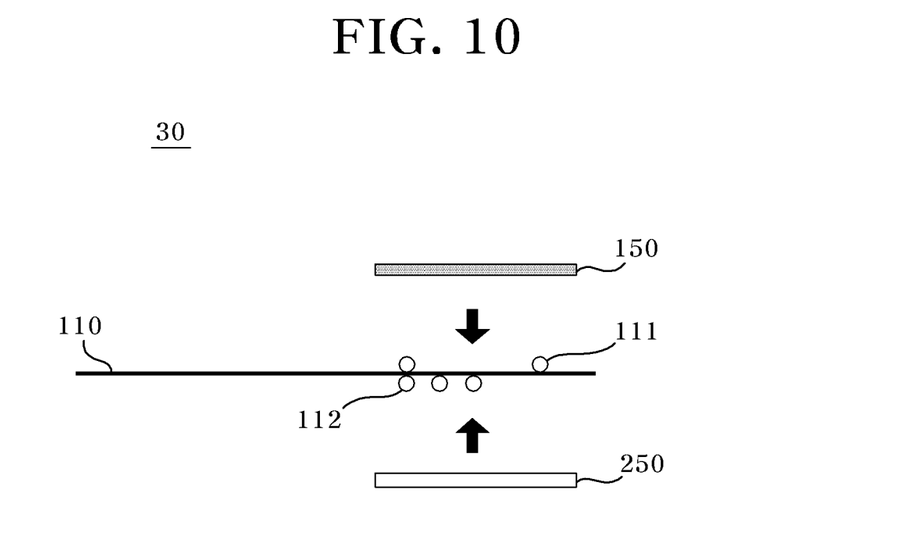
FIGS. 10 to 12 are schematic views illustrating an assembling process of an actuator module according to an exemplary embodiment of the present disclosure.
Figure 11:
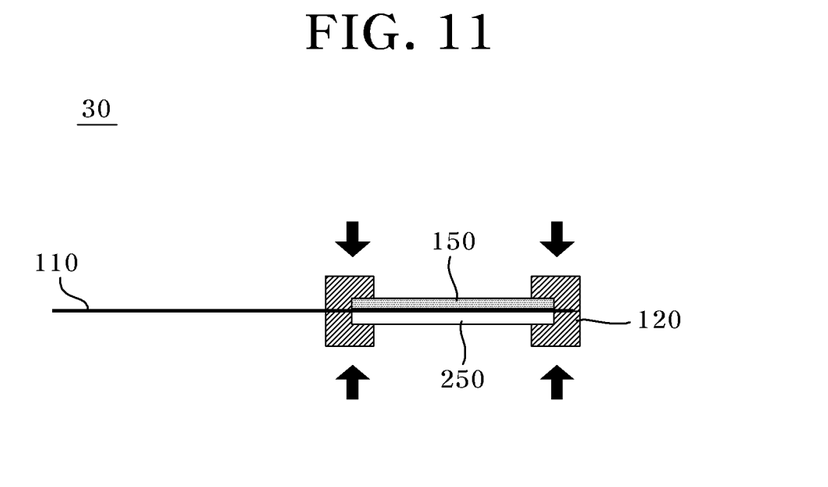
Figure 12:
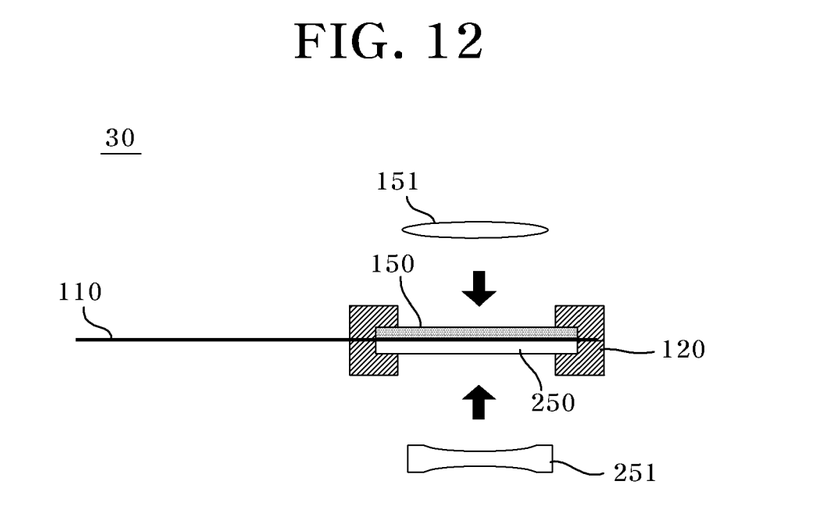
Figure 13:
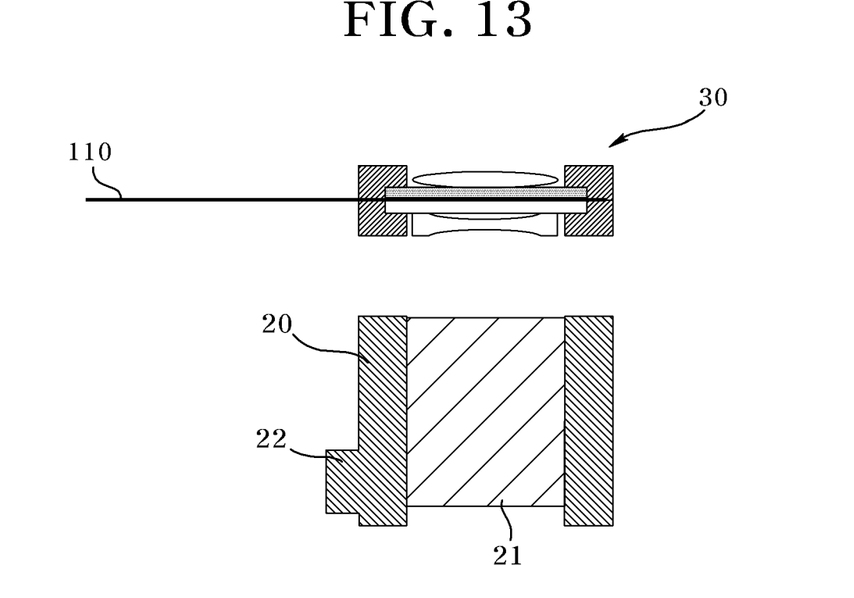
FIG. 13 is a schematic view illustrating a process to assemble an actuator module according to an exemplary embodiment of the present disclosure with a lens barrel.
Figure 14:
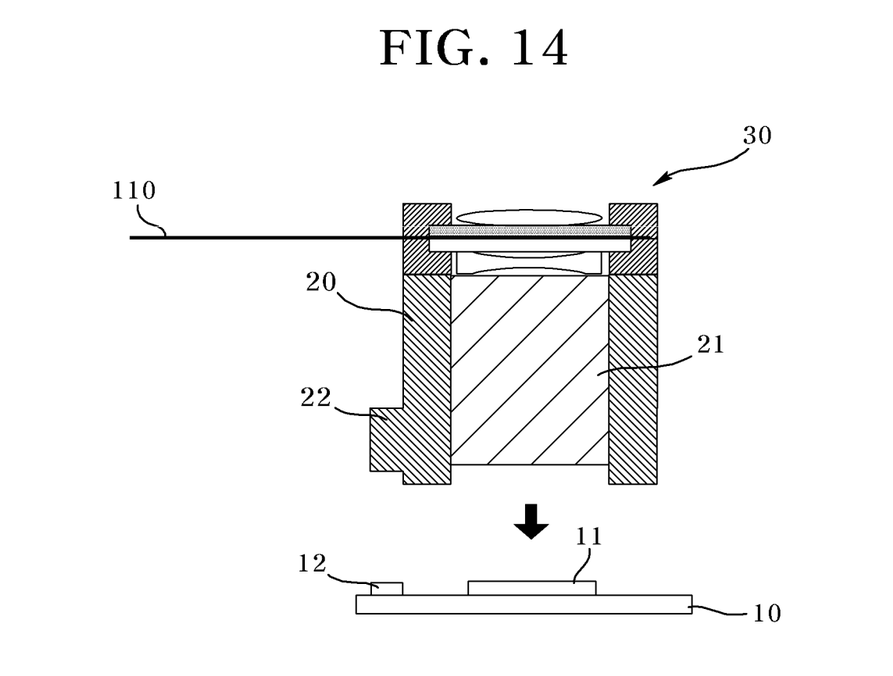
FIG. 14 is a schematic view illustrating a process to assemble a lens barrel having an actuator module coupled thereto with a printed circuit board having an image sensor mounted thereon.
Figure 15:
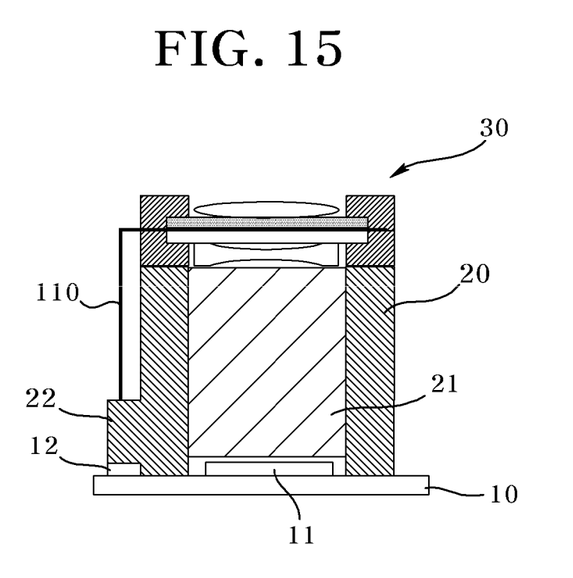
FIG. 15 is a schematic view illustrating a process to electrically connect an actuator module to a printed circuit board.

FIGS. 10 to 12 are schematic views illustrating an assembling process of an actuator module according to an exemplary embodiment of the present disclosure; FIG. 13 is a schematic view illustrating a process to assemble an actuator module according to an exemplary embodiment of the present disclosure with a lens barrel; FIG. 14 is a schematic view illustrating a process to assemble a lens barrel having an actuator module coupled thereto with a printed circuit board having an image sensor mounted thereon; and FIG. 15 is a schematic view illustrating a process to electrically connect an actuator module to a printed circuit board. Here, components identical to the components in forgoing exemplary embodiments will be given the same reference number to be described.

As illustrated in FIGS. 10 to 12, the camera module according to an exemplary embodiment of the present disclosure may include an actuator module (30) where an auto focusing module and a handshake compensation module are integratedly formed or formed as a single package.

As illustrated in FIGS. 10 to 12, the actuator module (30) according to a first exemplary embodiment of the present disclosure may include a module printed circuit board (110), a module actuator formed of first and second actuators (150) (250), a first moving lens (151) and a second moving lens (251).

The first printed circuit board (110) may be formed of F-PCB or may be provided as another type of printed circuit board for circuit connection, and as illustrated in the figures, may include, on a surface thereof, a first bead (111) to connect a plurality of terminals. A second bead (112) may be installed on the opposite surface at a position and not interfering with the first bead (111). A terminal portion to be connected to a connection portion (22) (to be described hereinafter) may be formed on an end portion of the module printed circuit board (110). The first and the second beads (111) (112) may be formed of gold material, and may be connected to terminal portions (not illustrated in the drawings) to deliver electric power and control signals to the module printed circuit board (110) through the terminal portions.

Meanwhile, as illustrated in FIG. 10, the actuator module (30) according to the present exemplary embodiment may include the first and the second actuators (150) (250) installed on both sides of the module printed circuit board (110).

In addition, as illustrated in FIG. 11, housing members (120) may be coupled on both ends of the first and the second actuators (150) (250) assembled on both surfaces of the module printed circuit board (110), so as to strongly fic the first and the second actuators (150) (250). The housing member (120) may be formed of a resin material in a shape of '⊏'. The housing member (120) may hold and fix the first and the second actuators (150) (250) inserted into a concave groove portion of the housing member (120).

In addition, when assembly of the first and the second actuators (150) (250) is completed, as illustrated in FIG. 3, the first and the second moving lenses (151) (251) may be installed on the packaged module printed circuit board (110) to form an actuator module (30).

Meanwhile, the first and the second actuators (150) (250) are modules that may respectively move each of the first and the second moving lenses (151) (251). Modules such as micro actuators, silicon actuators, disk-typed actuators, VCM (Voice Coil Motor), Piezo/Polymer lenses, optical diagrams, or liquid crystal micro lenses may be used as the first and the second actuators (150) (250). However, the structure of the first and the second actuators (150) (250) is not limited hereto. Various structures may be used according to the design of the camera module.

According to the present exemplary embodiment, the first actuator (150) may be configured to perform auto focusing function, and the second actuator (250) may be configured to perform handshake compensation function, but not limited hereto. The functions of the first and the second actuator (150) (250) may be configured in reverse.

Once the actuator module (30) is formed as described in the above, the actuator module (30) may be coupled to a lens barrel (20) having at least one lens (21) installed therein, as illustrated in FIG. 13. The actuator module (30) may be arranged in various positions. According to the exemplary embodiment, the actuator module (30) may be installed at an upper portion of the lens barrel, as illustrated in the figure. This is because the widest operation range, where the first and the second moving lenses (151) (251) installed in the actuator module (30) are operable, may be provided. The actuator module (30) and the lens barrel (20) may be coupled using adhesive member such as glue, epoxy, double-sided adhesive tape, etc. Otherwise, they may be coupled by a process such as heat welding or ultrasonic welding where the body components are connected to each other, or although it is not illustrated in the drawings, they may be physically coupled by forming complementary combinational structures.

After such coupling of the actuator module (30) and the lens barrel (20), as illustrated in FIG. 14, a printed circuit board (10) having an image sensor (11) mounted thereon may be coupled to a lower portion of the lens barrel (20). Here, at least one pair of terminal portions (12) may be formed on the printed circuit board (10), and the terminal portions (12) may be connected to a connection portion (22) to deliver electrical power and control signals to the lens barrel (20) and the actuator module (30). Here, the terminal portion (12) may be formed by being protruded on a surface of the printed circuit board (10), otherwise, by being intruded so as not to be protruded to outside, or may be formed flat thereon.

That is, as illustrated in FIG. 15, the module printed circuit boards (110) may be coupled to the connection portion (22) of the lens barrel (20) connected to the printed circuit board (10). As illustrated in FIG. 9, one end of the connection portion (22) may be conductibly connected to the first and the second printed circuit boards (110) (210), and another end of the connection portion is conductibly connected to the printed circuit board (10), so as to conductibly connect the first and the second printed circuit boards (110)(210) and the printed circuit board (10). The structure of the connection portion (22) may be formed in various ways. For example, a terminal member of metallic material may be formed on the lens holder (20), or an electronic circuit pattern layer for electrical wiring may be formed using a known surface electrode formation technology. Otherwise, the wiring may be formed using a separate wiring member.

In addition, although it is not illustrated in the figures, instead of the module printed circuit boards (110), an electronic pattern layer using a known surface electrode formation technology may be formed, or the first and the second actuators (150) (250) and the printed circuit board (10) may be conductibly connected using a separate wiring member. On this wise, an actuator module (30) to perform a plurality of functions may be formed, and the first and the second moving lenses (151) (251) may be assembled after the assembly process of the first and the second actuators (150) (250), when assembling the camera module. Thereby, the assembly faults occurrable during assembly process of the first and the second moving lenses (151) (251), and assemblability of the camera module may be enhanced.

In particular, the force generated during the lens assembly process may not be directly delivered to the first and the second actuators (150) (250) so as to minimize the assembly faults occurrable during assembly process, because the first and the second moving lenses (151) (251) are respectively assembled with the first and the second actuators (150) (250) after the first and the second actuators (150) (250) are supported by the housing member (120).

The embodiments described in the above and illustrated in drawings shall not be construed as limiting the technical spirit of the present disclosure. The protective scope of the present disclosure is to be limited only by the limitations disclosed in the claims, and a person skilled in the art of the present disclosure would be able to modify or transform the spirit of the present disclosure in various ways. Therefore, such modification or transformation shall be construed as being included within the protective scope of the present disclosure, as long as these modification or transformation would be obvious to those who skilled in the art.

INDUSTRIAL APPLICABILITY

The present disclosure is applicable to camera modules installed in small electronic devices such as mobiles phones, tablet PCs, etc.

What is claimed is:

1. A camera module, comprising:
a main printed circuit board mounted with an image sensor;
a lens barrel disposed at an upper side of the main printed circuit board and installed with at least one lens;
an actuator module disposed at an upper side of the lens barrel and comprising first and second actuators respectively installed with first and second moving lenses configured to respectively perform an auto focusing function and a handshake compensation function for an image formed on the image sensor;
a first printed circuit board coupled with the first actuator and the main printed circuit board; and
a second printed circuit board coupled with the second actuator and the main printed circuit board.

2. The camera module of claim 1, wherein the first and the second moving lenses are assembled after an assembly process of the first and the second actuators.

3. The camera module of claim 1,
further comprising a connection portion formed at the lens barrel; and
wherein one side end portion of the first and the second printed circuit boards is conductibly connected to the connection portion.

4. The camera module of claim 3, wherein the first and the second moving lenses are assembled at the first and the second actuators before an assembly process of first and second support portions.

5. The camera module of claim 3, wherein the first and the second moving lenses are assembled at the first and the second actuators after an assembly process of first and second support portions.

6. The camera module of claim 3, wherein the first printed circuit board is packaged at a first support portion, the second printed circuit board is packaged at a second support portion, and a third support portion corresponding to the first support portion is provided at an upper side surface of the first printed circuit board to support the first actuator.

7. The camera module of claim 3, wherein the first printed circuit board is packaged at a first support portion, the second printed circuit board is packaged at a second support portion, and a third support portion corresponding to the first support portion is provided at an upper side surface of the first printed circuit board to support the first actuator, and
the first to the third support portions, each size corresponding to the other, are coupled all at once.

8. The camera module of claim 3, wherein the first and the second printed circuit boards are formed of F-PCB.

9. The camera module of claim 3, further comprising:
a plurality of first beads and second beads interposed at a connection portion between the first and the second printed circuit boards and the first and the second actuators,
wherein the first and the second beads are arranged at a position not interfering with each other.

10. The camera module of claim 3, wherein one end of the connection portion is conductibly connected to the actuator module and another end of the connection portion is conductibly connected to the main printed circuit board.

11. A camera module, comprising:
a main printed circuit board mounted with an image sensor;
a lens barrel disposed at an upper side of the main printed circuit board and mounted with at least one lens;
an actuator module disposed at an upper side of the lens barrel and comprising first and second actuators respectively installed with first and second moving lenses configured to respectively perform an auto focusing function and a handshake compensation function for an image formed on the image sensor; and
a module printed circuit board coupled with the actuator module and the main printed circuit board;
wherein the first actuator is coupled on an upper surface of the module printed circuit board, and the second actuator is coupled on a bottom surface of the module printed circuit board.

12. The camera module of claim 11, wherein the first and the second moving lenses are assembled after an assembly process of a module actuator comprising the first and second actuators.

13. The camera module of claim 11, further comprising a housing member supporting both ends of a module actuator comprising the first and second actuators; and
a connection portion formed at the lens barrel and electrically connected with the actuator module,
wherein one side end portion of the module printed circuit board is conductibly connected to the connection portion.

14. The camera module of claim 13, wherein the first and the second moving lenses are assembled at the actuator module after an assembly process of the housing member.

15. The camera module of claim 13, wherein the module printed circuit board is formed of F-PCB.

16. The camera module of claim 11, further comprising:
a plurality of first beads and second beads interposed at a connection portion between the module printed circuit board and first and second actuators,
wherein the first and the second beads are arranged at a position not interfering with each other.

17. The camera module of claim 13, wherein one end of the connection portion is conductibly connected to the actuator module and another end of the connection portion is conductibly connected to the main printed circuit board.

\* \* \* \* \*